United States Patent
Sicotte et al.

(12) 
(10) Patent No.: US 6,187,581 B1
(45) Date of Patent: Feb. 13, 2001

(54) PROCESS AND COMPOSITION FOR TREATING HYDROCARBON CONTAMINATED MATERIAL

(75) Inventors: Paul Sicotte, DeWinton; Ari Laurell, Calgary, both of (CA)

(73) Assignee: Unotec Services International Inc., Bridgetown (BB)

( * ) Notice: Under 35 U.S.C. 154(b), the term of this patent shall be extended for 0 days.

(21) Appl. No.: 09/339,385

(22) Filed: Jun. 24, 1999

(30) Foreign Application Priority Data

Dec. 31, 1998 (CA) .................................................. 2257706

(51) Int. Cl.⁷ ....................................................... C12S 13/00
(52) U.S. Cl. ........................ 435/262; 435/262.5; 435/177
(58) Field of Search ..................... 435/174, 176, 435/177, 178, 179, 262, 262.5, 281; 210/680, 693, 671, 922; 71/6, 904

(56) References Cited

U.S. PATENT DOCUMENTS

| | | |
|---|---|---|
| 3,617,564 | 11/1971 | Vander Hooven et al. . |
| 3,871,956 * | 3/1975 | Azarowics . |
| 4,061,567 | 12/1977 | Kobayashi et al. . |
| 4,242,146 | 12/1980 | Kelly, Jr. . |
| 4,925,343 | 5/1990 | Raible et al. . |
| 5,009,790 | 4/1991 | Bustamente et al. ................ 210/689 |
| 5,395,535 | 3/1995 | Pinckard . |
| 5,554,575 | 9/1996 | Cutler et al. .......................... 502/404 |
| 5,618,725 | 4/1997 | Basseres et al. ..................... 435/262 |
| 5,635,392 | 6/1997 | Kopp-Holtwiesche et al. . |
| 5,700,558 | 12/1997 | Bopp .................................. 428/316.6 |
| 5,786,188 * | 7/1998 | Lamar et al. . |
| 5,976,210 * | 11/1999 | Sensibaugh . |

FOREIGN PATENT DOCUMENTS

| | | |
|---|---|---|
| 0414382A | 2/1991 | (EP) . |
| 9-289889 * | 11/1997 | (JP) . |
| WO9419942A | 9/1994 | (WO) . |

* cited by examiner

Primary Examiner—William H. Beisner
(74) Attorney, Agent, or Firm—Santosh K. Chari; Orange & Chari (57) ABSTRACT

A composition for treating materials contaminated with hydrocarbon compounds comprises a protein component, a bulking agent and a microbial culture capable of metabolizing the hydrocarbon contaminants. The composition is mixed with the contaminated material and absorbs or adsorbs the contaminants thereby preventing leaching of same into the environment. The microbial culture allows for biodegradation of the contaminant thereby removing any environmental risk associated with the contaminated material. The protein component and bulking agent are preferably organic in nature and the microbial culture may be indigenous to the protein material. The invention also provides a method of treating hydrocarbon-contaminated material using a composition as described above. The invention is particularly suited for treating contaminated drill cuttings.

10 Claims, 6 Drawing Sheets

Figure 2.
Changes in Initial Total Extractable Hydrocarbon Mass Fractions after 41 Days Under Different Amendment Conditions

Figure 3.
Changes in Initial Total Extractable Hydrocarbon Mass Fractions after 41 Days under Control Amendment Conditions

PROCESS AND COMPOSITION FOR TREATING HYDROCARBON CONTAMINATED MATERIAL

BACKGROUND OF THE INVENTION

1. Field of the Invention

The present invention relates to methods for treating materials contaminated with hydrocarbon substances and to compositions for such method. The invention is particularly related to oil contamination in drill cuttings generated from drilling well bores.

2. Description of the Prior Art

Oil contamination of land and water has become a major environmental problem. Many instances have been encountered where ecosystems have been severely damaged due to the accidental spillage of oils or other hydrocarbon compounds.

One area where oil contamination is regularly encountered is in bore-hole drilling systems either on or off shore. In the drilling process, oil contaminated drill cuttings are brought to the surface and collected. The cuttings and other material brought to the surface must be treated to remove the oil contaminants in order to prevent them from seeping into the soil or from being dumped into the water.

In order to address this problem various solutions have been proposed such as, for example, burning the cuttings or washing them with a detergent solution. The first method results in both safety and environmental risks. The second method involves a long process time and, possibly, further contamination risks depending upon the detergent used.

In U.S. Pat. No. 4,242,146, a method for treating oil contaminated drill cuttings from off shore drilling units is taught. In this patent, the contaminated cuttings are contacted with an oil absorbent substance such as clay in order to remove any free oil. The combination of cuttings and absorbent is then returned to the water. This reference does not teach a method of removing the oil contaminant but merely to absorb and free oil from the cuttings.

Various other references teach methods for treating oil spills on water bodies. U.S. Pat. No. 4,925,343 teaches a composition for cleaning oil spills comprising a particulate mixture of wood fiber and hydrophobic cotton lint materials. Similar methods are taught in U.S. Pat. Nos. 4,061,567 and 3,617,564. These references teach the use of synthetic or natural fibers for absorbing hydrocarbon contaminants from water or land.

Although addressing the oil spill these references do not deal with degrading the hydrocarbon contaminant to completely remove the contamination risk.

U.S. Pat. No. 5,395,535 teaches a process for removing hydrocarbon materials from water or land comprising spreading dried plant or vegetable matter over the spill. Cotton gin "trash" or waste is indicated as material for use in this process. The cotton material is spread over the oil spill to absorb and retain the contaminant. The material with absorbed oil is then allowed to ferment wherein bacteria indigenous to the cotton material biodegrade the hydrocarbon contaminants.

U.S. Pat. No. 5,635,392 also teaches a process for treating oil-contaminated material wherein microbial action is used to remove the contaminant. In this reference, a nutrient mixture, along with a microbial inoculum, is taught for addition to hydrocarbon contaminated material to stimulate the growth of the culture. In such manner, the contaminant is removed from the system.

Although the latter two references address the removal of the contaminant, the time taken for such biodegradation may lead to spread of the contamination before the removal is complete.

Thus, a need exists for an efficient process for removing hydrocarbon contamination on water or land and a process that accomplishes such removal while minimizing any leaching of contaminants. Therefore, the present invention seeks to provide a means of:

- on-site containment and treatment of drilling residue.
- on-site stabilization and immobilization of leachable hydrocarbons using only organic absorbents.
- on-site bioremediation of hydrocarbons through natural microbial biodegradation.

SUMMARY OF THE INVENTION

Therefore, in one embodiment, the present invention provides a composition for treating hydrocarbon-contaminated material including a protein component and a bulking component.

In another embodiment, the invention provides a process for treating hydrocarbon contaminated material with a treatment composition comprising a protein component, a bulking agent and a microbial culture capable of metabolizing the hydrocarbon contaminant, the process comprising the steps of:

1) contacting the material with the treatment composition to immobilize the hydrocarbon contaminant; and, 2) biodegrading the contaminant with the microbial culture.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Hydrocarbon contaminants according to the invention include any liquid contaminant that is organic, leachable and hydrophobic in nature such as gasoline, oil, creosote, etc. Such contaminants may be found as spills on water or land or in soil substrates, i.e. litter, clay, shale, drill cuttings etc., contaminated by such liquid contaminants. By way of example, the present invention will be described in relation to the treatment of drill cuttings. However, it will be appreciated that a variety of applications are possible for the invention.

As discussed above, the desired characteristics of a process for treating such hydrocarbon contamination are speed of removal and efficient degradation thereof of the contaminants. For this reason, the present invention provides, in one embodiment, a treatment composition for treating material contaminated by hydrocarbon contaminants as described above whereby such contaminants are safely removed by biodegradation. The composition of the invention comprises, as the active ingredients, a protein component and a bulking agent. In the preferred embodiment, the protein component and bulking agent are organic in nature.

The treatment composition according to a preferred embodiment of the invention is characterized by its ability to:

Constitute a primarily organic matrix;

Develop, sustain and/or promote a consortium of indigenous or artificially inoculated microorganisms capable of metabolizing the hydrocarbon contaminants to acceptable limits;

Prevent hazardous movement (i.e. leaching) of contaminants when in a biopile or spread over a soil surface in the presence or absence of water;

Be spread over any uncontaminated surface or subsurface soil and to protect the oil-free integrity of the receiving soil at the time of spreading or incorporation and anytime thereafter.

In the preferred embodiment, the protein component of the composition serves various purposes. Firstly, it provides a source of indigenous microorganisms that have the capability of biodegrading hydrocarbon contaminants. Secondly, the protein component serves as a source of nutrients for the microorganisms conducting the biodegradation process. In another embodiment, the required microorganisms may be comprise a separate additive to the treatment composition to provide the required microbial culture or to supplement or complement the culture included in the protein component. Whether or not the protein component provides a source of microorganisms is dependent upon the selection of the protein material. For example, it is mentioned above that cotton waste provides a source of indigenous hydrocarbon consuming microorganisms. Similar proteinaceous sources of microorganisms may also be used. For example, suitable sources for the protein component of the present invention include canola (or rape), soy, cotton, corn, or peanut material or from other protein based material or any combination thereof. Generally, the protein component comprises organic protein meal.

Another preferred characteristic of the protein component is its ability to absorb or adsorb the hydrocarbon contaminant. This sorptive capacity aids in immobilizing the hydrocarbon thereby preventing leaching of such compounds out of the containment mix, which is the combination of the contaminated material and treatment composition.

Therefore, the protein component of the invention is characterized by its ability to:

Display sorptive capacity for a range of hydrophobic organic contaminants;

Act as an oleophilic sorbent; preferential to oil in presence of water;

Eliminate (immobilize) free liquid contaminants during blending/mixing processes and subsequent to spreading over land;

Supply a source of elemental nitrogen in the form of protein;

Alter the bulk density of liquid contaminants or contaminated substrates;

Provide a source of indigenous microorganisms capable of metabolizing the hydrocarbon contaminants;

Be readily available and accessible in large volumes;

Remain stable, non phyto-toxic or micro-toxic.

As mentioned above, the bulking agent is preferably organic in nature. The bulking agent may comprise, for example, wood shavings, peat moss, straw, etc., or any combination thereof. The main function of the bulking agent is to build structure in the containment mix and secondly to provide additional contaminant absorbency. Such structure results in efficient gas or air exchange properties. This is important since in biodegradation processes, aerobic conditions are necessary to maintain the desired accelerated levels of microbial activity. Such conditions improve the efficiency of biodegradation, which is important when dealing with hydrocarbon contaminants. A single type of bulking agent or a combination of several may be used. Ideally, the bulking agents are chosen on their ability to reduce the overall bulk density of the containment mix and to provide appropriate conditions for microbial activity.

In another embodiment, the invention provides a process for treating hydrocarbon-contaminated material using a composition as described above. In the first step, the process immobilizes and stabilizes the contaminants in a homogeneous containment mixture. This is accomplished by contacting the contaminated material with the treatment composition of the invention as described above. Such contacting may be accomplished in a number of ways including mechanical or physical blending or mixing. The contacting phase serves to:

Achieve homogeneity (contaminant immobilization) on a macroscopic as well as microscopic level;

Dilute the contaminants with the treatment composition and other additives if required;

Achieve the desired contaminant immobilization and bulking by the ability to adjust the volume of the treatment composition;

Allow for the even incorporation of other additives to the mix such as microorganism inocula and/or additives (such as fertilizers, bionutrients, slow release oxygen agents, bioaugmentation agents, hydrocarbon washing/chain-severing agents, etc.) intended to stimulate or accelerate microbial activity in the containment mix.

In addition, the blending or mixing phase provides an opportunity to "wash" or dissolve soluble salts, metals, and other analytes from the contaminated material in order to alter the electrical conductivity, sodium adsorption ratio and pH of the containment mix produced.

The immobilization step is used to prevent or reduce any leaching of the contaminant. Such leaching is quantified by the Toxicity Characteristic Leaching Procedure (TCLP) which is a standardized leaching analysis test accepted by regulatory agencies. It is designed to determine the mobility of both organic and inorganic analytes present in liquid, solid and multiphase wastes. The test is conducted as follows: for wastes containing greater than or equal to 0.5% solids, a minimum of 100 g of solid phase sample is mixed with a volume of water equal to 20 times the weight of the solid phase. In this case, water is referred to as the extraction fluid. Characteristically, the water must be purified, de-ionized and organic-free. Sample preparation requires crushing, grinding and cutting if solids are greater than 9.5 mm in size. The mixture is placed into a specialized bottle extraction vessel with a minimum capacity of 2 L. The vessel is then placed into an agitation apparatus that rotates the vessel in an end-over-end fashion at 30 rpm for 18 hours.

Following agitation, the mixture is poured over a 0.6 to 0.8 μm glass fiber filter. The leachate is collected and analyzed for the presence of hydrocarbons.

Following the immobilization phase, microbial activity in the containment mix (i.e. the mixture of the contaminated material, treatment composition and any other additives) is allowed to continue whereby the hydrocarbon contaminants are biodegraded. As mentioned above, the source of the microorganisms for the biodegradation phase may be inherent or introduced. The protein component and bulking agent(s) constitute a primary source of indigenous microorganisms. Further, in another embodiment, manure, sewer sludge, or any other microbially active liquids or soils can also be used to introduce naturally-occurring microorganisms, capable of metabolizing hydrocarbons, to the containment mix during or following mixing. Also, genetically synthesized microbial inocula or cultures can also be used to introduce additional microorganisms into containment mixes during or following mixing activities.

With the present invention, hydrocarbon contaminants are disposed of safely without any further processing while limiting or preventing any leaching of the contaminants during the course of biodegradation.

As mentioned above, the invention has been described in connection with treating contaminated drill cuttings. However, the process and composition of the invention can similarly be applied to oil spills on land or water or to other material affected by hydrocarbon contamination.

The following examples and tests are provided to illustrate the advantages of the present invention and are not to be considered as limitations thereof.

1) Roof-Top Leach Tests

To test the hydrocarbon immobilization and stabilization capacity of treatment mixtures, specialized Roof-Top Leach Trays were designed. The objective was to develop a test to provide analytical evidence that petroleum hydrocarbons in samples remain immobilized and impervious to leaching. Descriptions of the respective samples, or mixes, (nine were tested) are provided in the results discussed below.

The mix ratio is an expression of the proportion of Canola meal that is required to treat a specified amount of drilling residue. It is determined using the Agitation/Filtration Test. The objective is to determine if a sufficient volume of Canola meal, acting as an oil absorbent, is present in the treatment mixture to effectively immobilize the total petroleum hydrocarbons associated with the mixture. The procedure for the agitation/filtration test is as follows:

1) A treatment mixture is placed into a sealed container. Water is added at a ratio of 5 parts solution to 1 part solids (residue), according to the following calculation: Conversion: An average of 500 mm of annual precipitation occurs over an area with a maximum depth of 10 cm (100 mm), therefore the conversion ratio is 500:100 or the equivalent of 5:1 ratio of water to mixture.

2) The container is sealed and forcefully agitated for approximately 2 minutes. While solids remain in suspension, the contents of the container are filtered through a funnel with a fine mesh screen. The filtrate is collected in a clear container and analyzed for the presence of a surface oil sheen. If present, a sheen is an indicator that the mix ratio used is not effective in completely immobilizing the hydrocarbon component of the particular mixture.

3) Subsequently, a mixing additive and re-trial is necessary.

The Roof-Top Leach Tray has a design similar to that of a steep pitched roof (30% slope) intended to simulate a worst case scenario. In total, a volume of 20 L of the sample mix is spread into each side of the leach tray (having dimensions 45 cm×45 cm or 20 cm×20 cm) up to a maximum thickness of 10 cm. Mixtures are held in place by screens that prevent the migration of solids but allow water flow freely. To simulate precipitation and run-off conditions, water is sprayed over the mixtures.

Although this design may be considered a severe exaggeration of extreme site conditions, the objective is to cause water to move quickly across and through the profile of the mixture to "wash" out all poorly absorbed or excess hydrocarbons. All excess water was collected as leachate in collecting trays equipped with drain plugs. The leachate was analyzed for the presence of petroleum hydrocarbons indicated by an oil sheen or sampled for laboratory analyses.

As preliminary results proved favourable, hydrocarbon immobilization was tested using the two tests discussed above: 1) the Agitation/Filtration Test and 2) the Toxicity Characteristic Leaching Procedure (TCLP).

Results of Leach Tests

The following are the results from the analytical testing of samples from the filtration and leach tests mentioned above. In total, nine samples were analyzed. The samples represented a full range of leachates, filtrates and solids with varying Total Petroleum Hydrocarbon (TPH) values.

To follow is an overview of sample descriptions, results of TPH tests, as well as an interpretation of the results.

| Sample 1 | |
|---|---|
| Type | Solid (500 ml) |
| Mix Ratio | No treatment |
| Description | A 500 ml (420 g) solid sample of residue/hog fuel was collected for sampling. The sample was pure and received no treatment. |
| Objective | To provide an indication of the percentage (by weight) of total petroleum hydrocarbons present in an untreated sample of JOMAX 4 residue/hog fuel mixture. |
| Analysis | 86,600 mg/Kg = 86,600 ppm = 8.66 TPH |

| Sample 2 | |
|---|---|
| Type | Leachate (250 ml) |
| Mix Ratio | No treatment |
| Description | A 500 ml (420 g) solid sample of residue/hog fuel was placed in a leach tray (20 cm × 20 cm). To the sample was added a total of 800 ml of water over 4 wettings to simulate the equivalent of 20 mm of rainfall. Of the total volume of leachate produced, a 250 ml sample was collected and analyzed. |
| Objective | To determine the concentration of petroleum hydrocarbons that leach from an untreated sample of JOMAX 4 residue/hog fuel mixture caused by 20 mm of precipitation. |
| Analysis | 6 mg/L = 6 ppm = 0.0006 TPH |

| Sample 3 | |
|---|---|
| Type | Solid (550 ml) |
| Mix Ratio | 4:1 (Residue: Rape Meal) Mix by Volume<br>7:1 (Residue: Rape Meal) Mix by Weight |
| Description | A 400 ml (336 g) sample of drilling residue/hog fuel was mixed with 100 ml (48 g) of rape meal and placed in a leach tray (20 cm × 20 cm). To mimic an above average volume of rainfall, the mixture received a daily application of 200 ml of water over a period of 4 days. In total, 800 ml of water or equivalent of 20 mm of rain was sprinkled over the mixture (See Conversion). After 4 hours, leaching had terminated. The solids were collected from the leach tray mid analyzed. |

-continued

Sample 3

| | |
|---|---|
| Conversion | Area of Leach Tray = 0.20 m × 0.20 m = 0.04 m$^2$ |
| | Max Average precip. = 5 mm = 0.005 m |
| | Volume precip. = 0.0005 m × 0.04 m$^2$ = 0.0002 m$^3$ × (1 L/0.001 m$^3$) = 200 mL |
| Objective | To determine the total volume of petroleum hydrocarbons that remain immobilized by solid particles (cuttings and rape meal) during the simulation of 4 maximum precipitation events. |
| Analysis | 40,300 mg/Kg = 40,300 ppm = 4.03 TPH |

Sample 4

| | |
|---|---|
| Type | Leachate (250 ml) |
| Mix Ratio | 4:1 (Residue: Rape Meal) Mix by Volume |
| | 7:1 (Residue: Rape Meal) Mix by Weight |
| Description | Of the total volume of leachate produced by the treatment of Sample 1. A 250 ml sample was collected for analysis. |
| Objective | To provide an indication of the total concentration of petroleum hydrocarbons leached expected to leach from a mixture during the simulation of 4 maximum precipitation events. |
| Analysis | 4 mg/L = <4 ppm = 0.0004 TPH |

Sample 5

| | |
|---|---|
| Type | Filtrate (250 ml) |
| Mix Ratio | 4:1 (residue: rape meal) Mix by volume |
| | 7:1 (Residue: Rape Meal) Mix by Weight |
| Description | To produce a filtrate, 400 ml (336 g) of residue was mixed with 100 ml (48 g) of rape meal and placed into a fine screened funnel. To mimic the equivalent of 20 mm of rain, 600 ml of water was poured over the mixture. After 4 hours, filtration appeared to have ceased and a 250 ml sample of filtrate was collected and analyzed. |
| Objective | To determine the total volume of petroleum hydrocarbons that are dissolved and "washed" from a mixture as a result of normal hydrologic and gravitational forces acting upon the mixture. |
| Analysis | <4 mg/L = <4 ppm = 0.0004 TPH |

Sample 6

| | |
|---|---|
| Type | Filtrate (250 ml) |
| Mix Ratio | 4:1 (residue: rape meal) Mix by Volume |
| | 7:1 (residue: rape meal) Mix by Weight |
| Description | A 500 ml mixture of residue/hog fuel (400 mL/336 g) and rape meal (100 mL/48 g) was placed into a seated 2.5 L container. The container was filled to capacity with 2.5 L of water, the equivalent of maximum volume of annual precipitation of 500 mm (Statistics Canada, 1997). The container was agitated for 2 minutes. Prior to settling, the suspended mixture was poured into a fine. screened funnel. After 4 hours, filtration was terminated. The funnel was squeezed to force out any trapped water within the mixture. A 250 ml sample of the filtrate was analyzed. |
| Objective | Through direct comparison with the results from Sample 5, the immobilizing capacity for hydrocarbons of rape meal and cuttings versus the influence of extreme hydrologic and gravitational forces can be determined. |
| Analysis | 41 mg/L = 41 ppm = 0.0041 TPH |

Sample 7

| | |
|---|---|
| Type | Leachate (250 ml) |
| Mix Ratio | 2:1 (residue: rape meal) Mix by Volume |
| | 3.5:1 (residue: rape meal) Mix by Weight |
| Description | A mixture of 300 ml (252 g) of residue and 150 ml (72 g) of rape meal was placed into a leach tray. The mixture received the equivalent of 40 mm of precipitation to simulate 8 rainfall events of equal magnitude. A 250 ml sample of the leachate was collected and analyzed. |
| Objective | To determine the concentration of total petroleum hydrocarbons in leachate generated from residue treated with rape meal by 40 mm |
| Analysis | 39 mg/L = 39 ppm = 0.0039 TPH |

Sample 8

| | |
|---|---|
| Type | Filtrate (250 ml) |
| Mix Ratio | 2.0:1 (residue: rape meal) Mix by Volume |
| | 3.5:1 (residue: rape meal) Mix by Weight |
| Description | To produce a 250 ml sample of filtrate, 300 ml (252 g) of residue was combined with 150 ml (72 g) of rape meal and placed into a sealed container. To the container was added 1.6 L of water to simulate the equivalent of 40 mm of precipitation. The container was sealed and forcefully agitated for approximately 2 minutes. While the solids remained in suspension, the mixture was poured into a fine screened funnel and allowed to filter for 4 hours. |
| Objective | To determine the total volume of petroleum hydrocarbons that are dissolved and "washed" from a mixture as a result of normal hydrologic and gravitational forces acting upon the mixture. |
| Analysis | 36 mg/L = 36 ppm = 0.0036 TPH |

Sample 9

| | |
|---|---|
| Type | Filtrate (250 ml) |
| Mix Ratio | No Treatment |
| Description | A 500 ml (420 g) sample of pure rape meal was placed into fine screened funnel. A filtrate was produced by pouring 1.6 L of water (equivalent of 40 mm of rain) over the rape meal. The rape meat was left to filter for approximately 4 hours. A 250 ml sample of the filtrate was collected and analyzed. |
| Objective | To determine the concentration of organic (as opposed to petroleum) hydrocarbons leachable from rape meal under normal gravitation and hydrologic conditions. |
| Analysis | <4 mg/L = <4 ppm = <0.0004 TPH |

| Sample | Description | Results | TPH (%) |
|---|---|---|---|
| 1 | Raw hog fuel/residue solids (no treatment) | 86,6000 mg/kg | 8.66 |
| 2 | Raw hog fuel/residue leachate (4 wettings) | 6 mg/L | 0.0006 |
| 3 | 4:1 Leached solids (4 wettings) | 40,300 mg/kg | 4.03 |
| 4 | 4:1 Leachate (4 wettings) | <4 mg/L | <0.0004 |
| 5 | 4:1 Filtrate | <4 mg/L | <0.0004 |
| 6 | 4:1 Agitate/filtrate | 41 mg/L | 0.0041 |
| 7 | 2:1 Leachate (8 wettings) | 39 mg/L | 0.0039 |
| 8 | 2:1 Agitate/filtrate | 36 mg/L | 0.0036 |
| 9 | Rape meal filtrate | <4 mg/L | <0.0004 |

Discussion

The objective of the above analytical testing was to use the presence or absence of detectable hydrocarbons in liquids and solids following leaching or filtration, to indicate how effectively rape meal (canola meal) and cuttings can immobilize hydrocarbons. In similar terms, the hydrocarbon concentration of leachates and filtrates is inversely proportional to the amount of hydrocarbons immobilized. As expected, the greatest concentration of hydrocarbons (8.7%) occurred in the sample of raw (untreated) residue. This value is somewhat conservative compared to average retort results of 14%. The difference may be caused by the dilution resulting from varying amounts of cellulose among the samples as contributed by the hog fuel constituent.

Mix Ratios

Despite the fact that many different mix ratios were initially tested with varying degrees of success, favourable results were obtained when residue was treated with rape meal at a ratio of 4 to 1 by volume or 7 to 1 by weight, thus becoming the target mix ratio for further analytical testing. The results from the mixing ratio of 2 parts residue to 1 part rape meal by volume (or 3.5 to 1 by weight), were also tested to provide a reference for comparison as well as an indication of whether "more is better" in terms of using rape meal as an absorbency treatment for petroleum hydrocarbons. Comparison of results from Sample 5 and 8 indicate that seemingly less rape meal is better than more in that the TPH of Sample 5 filtrate was considerably less than that of Sample 8. However, a difference in the concentration of hydrocarbons and amount of hog fuel in the two samples prior to mixing may also have contributed to the difference. Regardless, the difference is well below imposed limits (1000 ppm or 0.1%) and is therefore negligible.

Duration

In most cases, sampling occurred after the equivalent of only 4 and 8 precipitation events of maximum intensity. The leachate produced during this seemingly short time frame was expected to reflect a biased concentration of hydrocarbons in solution as a consequence of hydrocarbon "washing". The expectation is that, initially, a higher than normal concentration of hydrocarbons will occur in leachates as excess or poorly absorbed hydrocarbons are "washed" or released from mixtures. As a result, all values can be considered as maximums.

Limitation of TPH Testing

Although, TPH testing is widely used as an accurate analysis of the presence of petroleum hydrocarbons, one limitations does exist. The TPH or MOG (mineral/oil/grease) test is non-selective. It will not differentiate between the different types of petroleum hydrocarbons such as the lighter aromatics (hydrocarbon rings) and the heavier aliphatics (hydrocarbon chains). However, as the present invention is concerned with the immobilization of all petroleum hydrocarbons present in drilling residue, the TPH test analysis is sufficient for the purposes of illustration.

2) Biodegradation Tests

The following tests were conducted to assess the effect of various additives to the treatment mix on hydrocarbon biodegradation for on-site drilling waste treatment and disposal. The tested additives included:

1. Re-Activated Sludge (RAS) obtained from the City of Calgary sewage treatment plant intended to provide an initial inoculum of bacteria, potentially with hydrocarbon-degrading ability.

2. Biocat 4000—an organic and inorganic liquid nutrient source intended to provide a complete nutrient source to support microbial growth and hydrocarbon biodegradation activity.

3. Percarbonate (OX)—a solid oxygen release compound intended to provide more oxygen for faster biodegradation rates.

The test was run for six weeks (41 days) at room temperature without mixing to assess the effect of the various additives in enhancing the hydrocarbon biodegradation rate over that of a control (no additives).

Methods

The following samples were tested:

a) One 20 L pail of compost mix (oily shale cuttings, wood chips and canola meal).
   Note: the pail was sealed and apparently went anaerobic during shipping and storage as it had a strong, pungent odour.

b) One 500 ml glass jar containing a slow-release oxygen compound (fine white powder), four 1 L glass jars of reactivated sludge (RAS). These had gone anaerobic, based on the odour when opened. All jars were pooled into a 10 L container and aerated overnight to restore aerobic conditions and ensure viability of the RAS.

c) One 4 L plastic jug of Biocat 4000, containing 70% organic+30% inorganic nutrient base.

To each of four 6 L reactors (with removable gasket sealed lids) was added 4 L of the treatment mixture. The different additives tested were as follows:

Test Solutions

| Sample | Additives |
| --- | --- |
| 1 | 240 ml of reverse-osmosis de-ionized water (DRO) (simulating rainfall) |
| 2 | 200 ml of Recycle Activated Sludge (RAS) (6 vol%); 40 ml of DRO |
| 3 | 200 ml RAS;<br>40 ml of Biocat 4000 dilution (2 ml concentrate in 38 ml DRO) |
| 4 | 200 ml of RAS<br>40 ml of Biocat 4000 dilution (2 ML concentrate in 38 ml DRO)<br>40 ml of Percarbonate Oxygen Release Additive (OX) (1 vol%) |

All 4 L test blends were thoroughly mixed by hand in an 8 L vessel before being placed into the 6 L reactors. A soil moisture probe indicated that all mixes were wet, but no free-standing water was present. Each test mixture was sampled (200 ml) for initial analysis of:

pH

Electrical conductivity, EC (dS/m)

Moisture content (wt %)

Total heterotrophic bacteria (THB) by Most Probable Number (MPN) (48 hr MPN/g)

Hydrocarbon-degrading bacteria (HDB) by MPN (14 day MPN/g)

Total Extractable Hydrocarbons (T.E.H. $C_8$–$C_{30}$, by GC/FID analysis) (mg/kg)

Available Nutrients (N, P, K, S) (mg/kg)

Total Kjeldahl Nitrogen (TKN) (wt %)

All reactors were incubated at room temperature, which varied between 19 and 24° C. The surface of each reactor was exposed to the room light for about 8 hours a day.

Periodically, the gasket lids were placed on the reactors and the rate of oxygen uptake and carbon dioxide evolution was recorded. Following determination of the respiration rate, the lids were removed to ensure continued passive aeration of the mix. To assess the potential for passive diffusion of air from the surface, no further mixing was done. Depth of each test mix in the reactors was recorded at the start and end of the test to determine the extent of compaction following active degradation.

Results and Discussion

The test was run for 41 days. The analytical results on Day 0 and Day 41 are summarized in the following table:

| Parameter | Test Day | Initial Mix | Test 1 | Test 2 | Test 3 | Test 4 |
|---|---|---|---|---|---|---|
| pH | 0 | N/D | 7.3 | 7.8 | 7.7 | 9.1 |
|  | 41 |  | 7.7 | 7.8 | 7.8 | 9.4 |
| EC | 0 | N/D | N/D | N/D | N/D | N/D |
|  | 41 |  | 4.96 | 4.83 | 4.54 | 8.26 |
| Moisture | 0 | 37.3 | 40 | 40 | 40 | 36 |
|  | 41 |  | 19 | 24 | 21.7 | 21.8 |
| Mix Temp (° C.) | 0 | N/A | N/D | N/D | N/D | N/D |
|  | 5 |  | 29 | 29 | 31 | 30 |
|  | 8 |  | 25.5 | 26 | 27 | 26 |
|  | 13 |  | 24.5 | 24.5 | 26 | 25.5 |
|  | 26 |  | 23 | 23.5 | 24 | 23.8 |
|  | 41 |  | 23.5 | 23.5 | 23.5 | 23.5 |
| Mix height (cm) | 0 | N/A | 12.5 | 13 | 12 | 13 |
|  | 41 |  | 11.5 | 11 | 11 | 11.3 |
| Heterotrophic bacteria | 0 | N/D | $1.3 \times 10^9$ | $>10^{11}$ | N/D | N/D |
|  | 41 |  | $2.1 \times 10^{10}$ | $>10^{11}$ | $>10^{11}$ | $2.3 \times 10^8$ |
| HC-degrading bacteria | 0 | N/D | $7.9 \times 10^2$ | $1.3 \times 10^3$ | N/D | N/D |
|  | 41 |  | $1.3 \times 10^4$ | $4.9 \times 10^2$ | $2.8 \times 10^4$ | $2.3 \times 10^2$ |
| Total Kjeldahl nitrogen | 0 | 0.97 | 1 | 1.05 | 1.03 | 1 |
|  | 41 |  | 0.87 | 0.88 | 0.89 | 0.85 |
| Ammonia-N | 0 | N/D | N/D | N/D | N/D | N/D |
|  | 41 |  | 29.9 | 1700 | 1780 | 1350 |
| Nitrate-nitrogen | 0 | N/D | 4.4 | 5 | 5.1 | 4.4 |
|  | 41 |  | 1 | 7.4 | 1.2 | 1.3 |
| Phosphate-P | 0 | N/D | 56 | 81 | 80 | 110 |
|  | 41 |  | 78 | 101 | 115 | 155 |
| Sulphate-S | 0 | N/D | 378 | 377 | 368 | 754 |
|  | 41 |  | 564 | 520 | 508 | 1400 |
| Potassium | 0 | N/D | 955 | 1550 | 1320 | 1220 |
|  | 41 |  | 1450 | 1860 | 1600 | 1590 |
| Total extractable HC | 0 | 114561 | N/D | N/D | N/D | N/D |
|  | 41 | N/D | 40280 | 59155 | 69571 | 85437 |
| % T.E.H reduction | 41 | N/A | 65 | 48 | 39 | 25 |

N/D - not determined; N/A - not applicable

Figure 1:
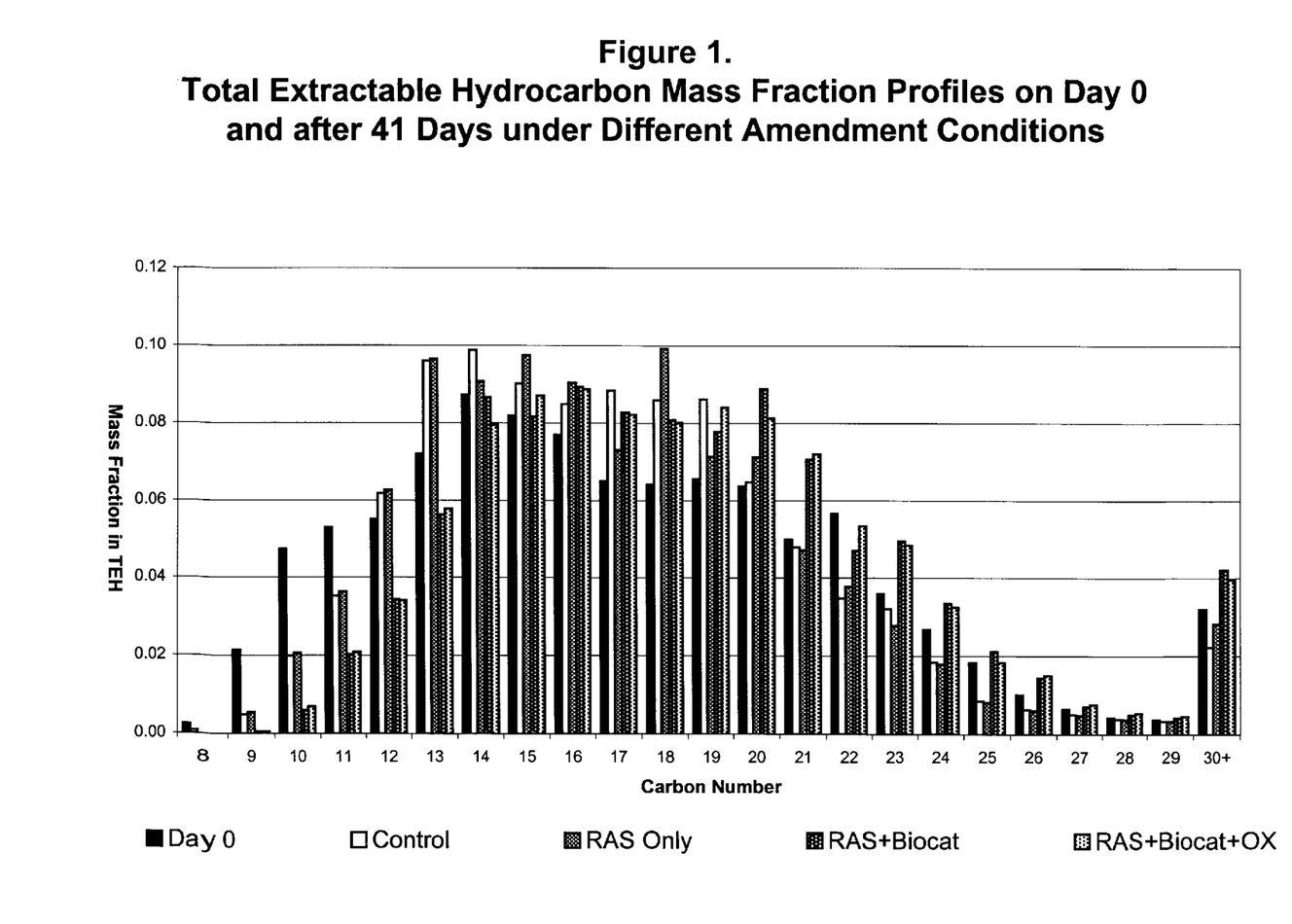
FIG. 1 illustrates the total extractable hydrocarbon mass fraction profiles on Day 0 and Day 41 under different additive conditions in the biodegradation tests.

The initial mix contained about 114,600 mg/kg total extractable hydrocarbons. This is shown in FIG. 1, illustrates the mass fractions of the total extractable hydrocarbons (T.E.H.) from the initial mix at test Day 0 compared to the residual T.E.H. from each test after Day 41. Only about 3% of the T.E.H. was C30+ material.

Test 1—Control

The control was the same as the initial mix, but received sufficient water to support good bioactivity. Overall, the control appears to have yielded the best hydrocarbon degradation results.

Composting activity was evident by the increase in temperature within the test mix on Day 5 through Day 26. The test mix retained 92% of its initial height after 41 days.

There was a higher than expected initial bacterial population ($1.3 \times 10^9$ MPN/g) in the control, suggesting that a natural bacterial inoculum may have been provided with the mix nitrogen source, wood shavings, and/or the drill cuttings. The initial hydrocarbon-degrading bacteria count was much lower ($7.9 \times 10^2$) indicating that the population had not yet adapted to the hydrocarbon content. It should also be noted here that a significant development of white-rot fungi was not observed in any test mix, contrary to reports from field observations during composting of the mix not containing any additives.

Figure 2:
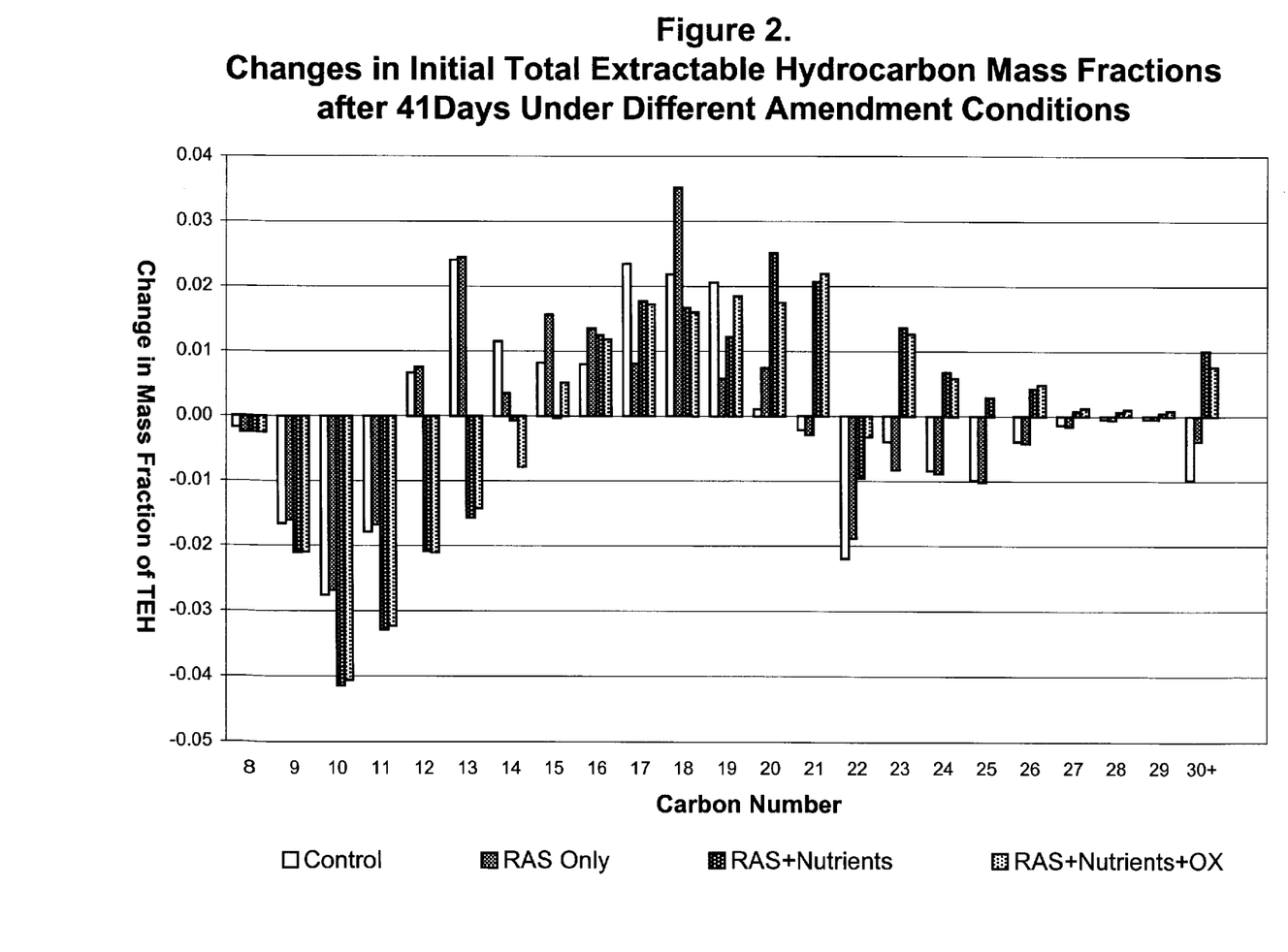
FIG. 2 illustrates the changes in total extractable hydrocarbon mass fractions after 41 days under different additive conditions in the biodegradation tests.
Figure 3:
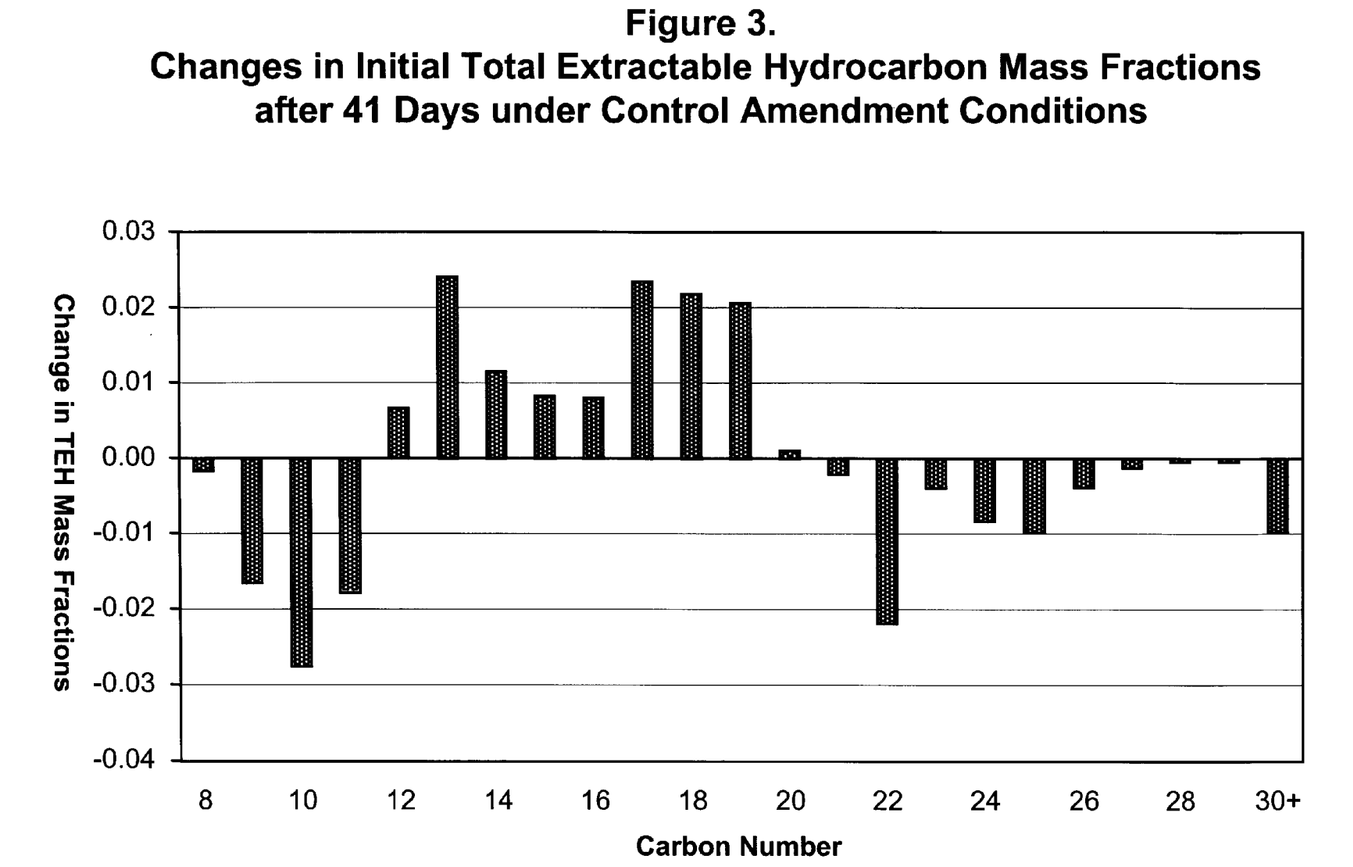
FIG. 3 illustrates the changes in initial total extractable hydrocarbon mass fractions after 41 days under control additive conditions in the biodegradation tests.

The control mix provided the greatest extent of hydrocarbon biodegradation (85%, based on a single composite sample analysis). FIGS. 2 and 3 illustrate the results of the GC/FID analysis of the residual hydrocarbons in the C8–C30 range compared to the initial hydrocarbons present at Day 0. A negative change in the mass fraction of the residual hydrocarbons indicates that there is less of that fraction than in the initial hydrocarbon. The loss of both light (C8–C11) and heavy (C21–C30+) hydrocarbons shows that biodegradation is occurring. Some of the C8–C11 loss may be due to volatilization during preparation of the additive containing test mixes. The apparent increase in the C12–C20 range hydrocarbons results from the mass fractions needed for total unity (1). Some of the heavy fractions may have been degraded to smaller hydrocarbons in the C12–C20 range.

Nutrient analysis showed that no nutrients were limiting following the 41-day test. Moisture content had dropped to about one-half of the initial, despite periodic misting of the surface of the test mix. At the end of the test, the moisture content in the top ¾ of the test mix was only 9.1 wt %, whereas the bottom ¼ was 35.4 wt %.

Figure 4:
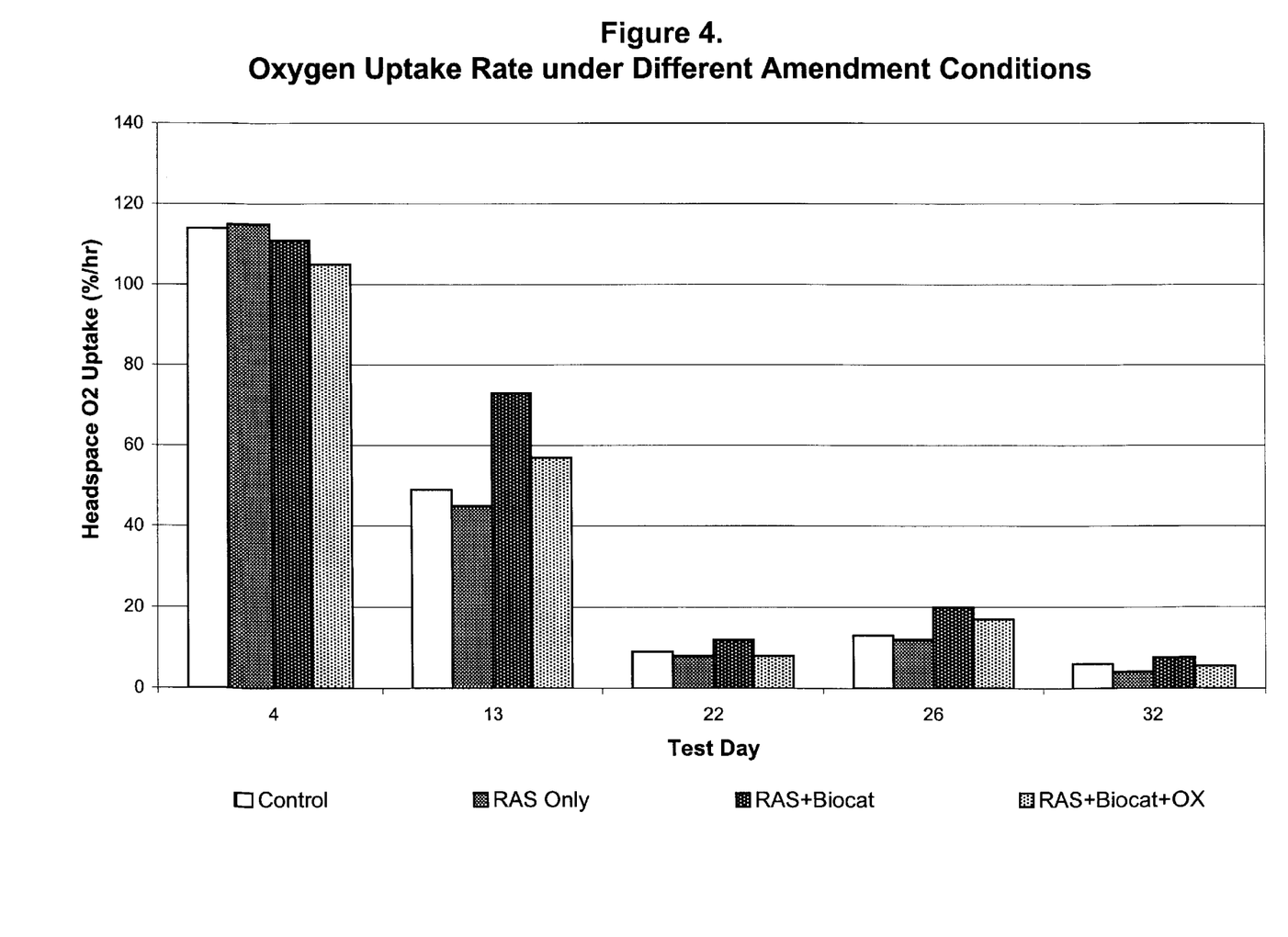
FIG. 4 illustrates the oxygen uptake rate under different additive conditions in the biodegradation tests.
Figure 5:
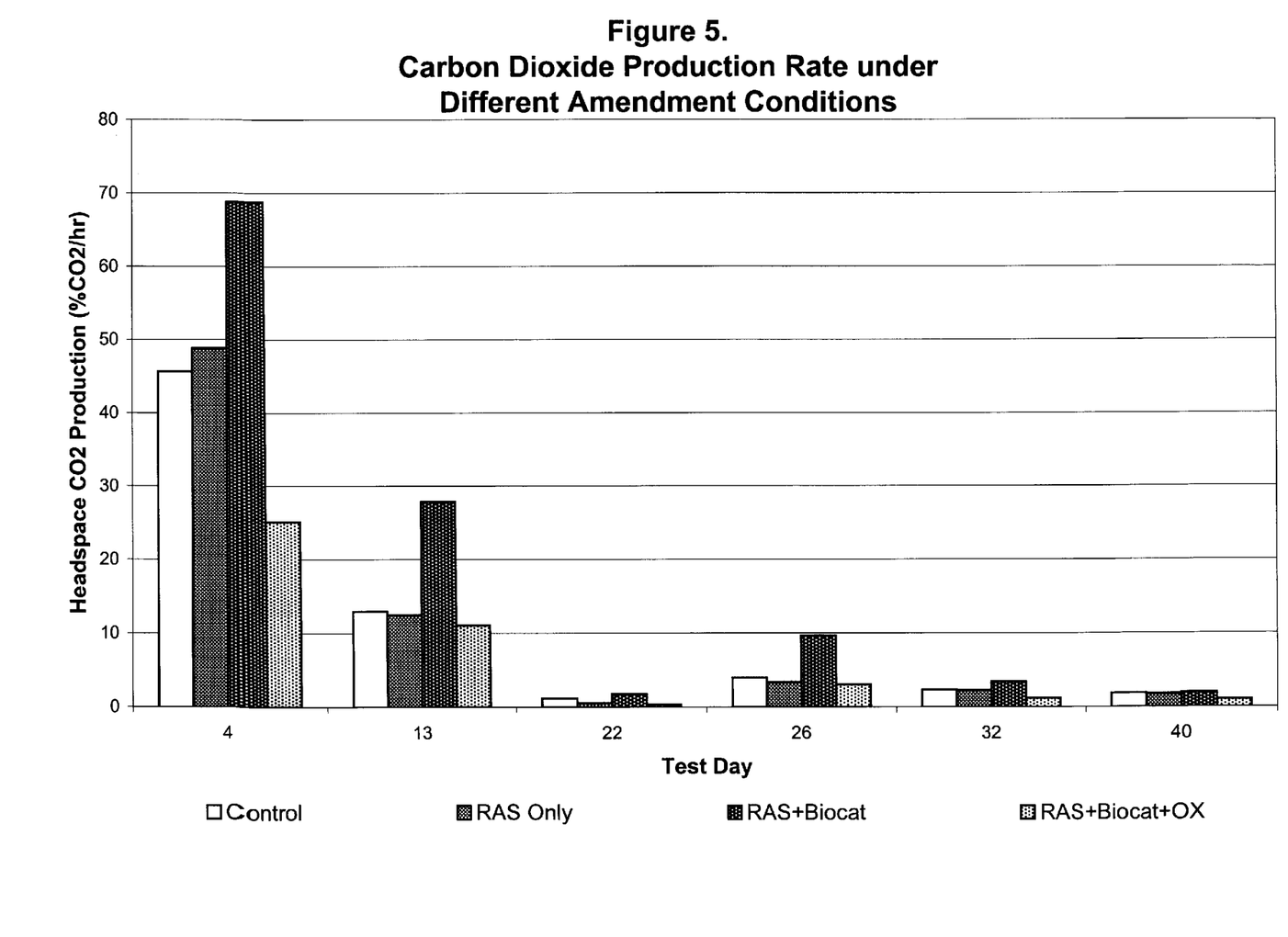
FIG. 5 illustrates the carbon dioxide production rate under different additive conditions in the biodegradation tests.

The low moisture present at the end of the test would explain the drop-off of respiration activity as shown in FIGS. 4 and 5 after Day 13. Since mixing was not allowed during the test, it was difficult to ensure adequate moisture was maintained throughout the test mix. A definite layering of moisture was observed in all tests, with the bottom being wet and the top being dry.

Continued watering would have allowed free water to collect on the bottom of the reactor, which would have lead to anaerobic conditions. In future tests, reactors with leachate drains should be used so that more water can be added throughout the test.

Test 2—RAS Only

Composting activity was evident by the increase in temperature within the test mix on Day 5 through Day 26. The test mix retained 87% of its initial height after 41 days.

The addition of the recycled activated sludge (RAS) increased the initial bacterial population as expected ($>10^{11}$ MPN/g), although the effect was not as pronounced because of the high initial population in the initial mix. The initial hydrocarbon-degrading bacteria count was still low ($1.3 \times 10^3$) indicating that there was not a high proportion of hydrocarbon-degrading bacteria in the RAS.

The sample with only the RAS additive provided the second greatest extent of hydrocarbon biodegradation (48%, based on a single composite sample analysis). FIG. 2 shows the results of the GC/FID analysis of the residual hydrocarbons in the C8–C30 range compared to the initial hydrocarbons present at Day 0. Similar to the Test 1 results, the loss of both light (C8–C11) and heavy (C21–C30+) hydrocarbon, together with positive respiration data, shows that biodegradation is occurring. Some of the C8–C11 loss may be due to volatilization during preparation of the test mixes.

Nutrient analysis showed that no nutrients were limiting following the 41-day test. Unlike the Control test, the RAS additive caused a high ammonia content to develop in the test mix by Day 41 (1700 mg/kg $NH_4$—N). This could be a result of the degradation of the some RAS bio-solids, releasing ammonia through de-amination of proteins. This level of ammonia may be toxic to some bacteria. The heterotrophic bacterial count remained high ($>10^{11}$ MPN/g) indicating that significant bacteria death had not occurred. The hydrocarbon-degrading bacteria population had not increased, or had not remained viable by Day 41.

Moisture content had dropped to about one-half of the initial, despite periodic misting of the surface of the test mix.

At the end of the test, the moisture content in the top ¾ of the test mix was only 9.4 wt %, whereas the bottom ¼ was 39 wt %.

The low moisture present at the end of the test would explain the drop off of respiration activity as shown in FIGS. 4 and 5 after Day 13. This may also explain the low hydrocarbon-degrading bacteria count.

Test 3—RAS+Biocat 4000

Composting activity was evident by the increase in temperature within the test mix on Day 5 through Day 26. Test 3 showed the highest sustained temperature increase, indicating the greatest bioactivity. The test mix retained 92% of its initial height after 41 days.

Although not analyzed directly, the addition of the re-activated sludge (RAS) should have increased the initial heterotrophic bacterial population similar to Test 2. The initial hydrocarbon-degrading bacteria count would also be similar to Test 2 as the Biocat 4000 does not contain live bacteria (not confirmed in this test).

The RAS+Biocat 4000 additive provided the third greatest extent of hydrocarbon biodegradation (39%, based on a single composite sample analysis). FIG. 2 shows the results of the GC/FID analysis of the residual hydrocarbons in the C8–C30 range compared to the initial hydrocarbons present at Day 0. A greater loss of light (C8-C14) and less loss of heavy (C22 only) hydrocarbons was observed. The change in hydrocarbon from the initial shows that biodegradation is occurring, but to a lesser extent then in Tests 1 and 2. As before, some of the C8–C11 loss may be due to volatilization during preparation of the test mixes. Biocat 4000 may also have introduced some vegetation-based organics that show up in GC/FID analysis as hydrocarbons in the C15–C30+ range, although this remains to be determined.

Nutrient analysis showed that no nutrients were limiting following the 41-day test. Similar to Test 2, the RAS additive caused a high ammonia content to develop in the test mix by Day 41 (1780 mg/kg $NH_4$—N). The heterotrophic bacterial count remained high (>$10^{11}$ MPN/g) indicating that significant bacteria death had not occurred. The hydrocarbon-degrading bacteria population had increased compared to Test 2, but was still low on Day 41.

Moisture content had dropped to about one-half of the initial, despite periodic misting of the surface of the test mix. At the end of the test, the moisture content in the top ¾ of the test mix was only 9.6 wt %, whereas the bottom ¼ was 38 wt %.

Figure 6:
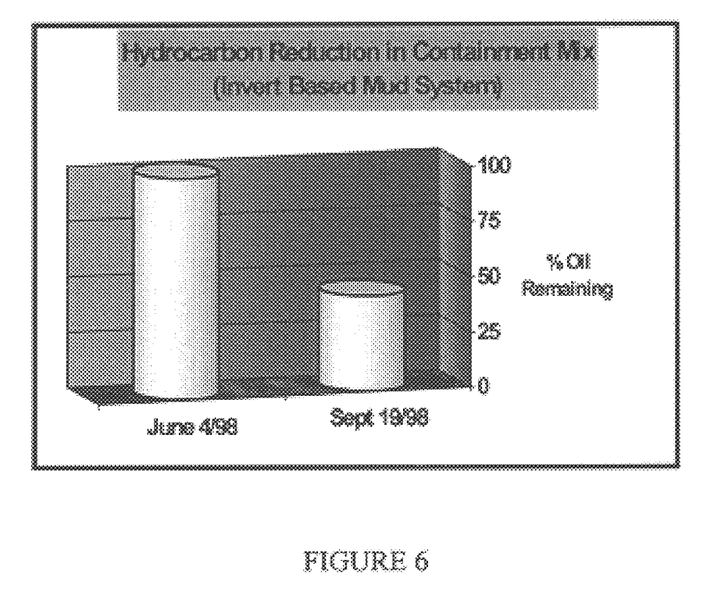
FIGS. 6 and 7 illustrate the hydrocarbon reduction during the bioremediation field plot tests.

Test 3 had the overall highest rate of respiration, which agrees with the highest observed temperature in this test mix. The low moisture present at the end of the test would explain the drop off of respiration activity as shown in FIGS. 4 and 6 after Day 13. This may also explain the low hydrocarbon-degrading bacteria count.

Test 3 showed the highest apparent bioactivity, but only the third highest reduction in residual T.E.H. This may have resulted because the RAS additive introduced a significant population of bacteria more adapted to degrading the wood shavings (cellulolytic activity) and organic nitrogen source in the initial mix than the hydrocarbons and was stimulated by the Biocat 4000.

Test 4—RAS+Biocat 4000+Percarbonate Oxygen Release, Compound (OX)

Composting activity was evident by the increase in temperature within the test mix on Day 5 through Day 26. The test mix retained 87% of its initial height after 41 days.

The most noticeable difference in this test was the high pH of 9.4 that developed as a result of the percarbonate addition. The initial pH was raised from about 7.7 to 9.1 by the addition of 1 vol % percarbonate. This high pH would have an inhibitory effect on the bacterial activity.

Although not analyzed directly, the addition of the recycled activated sludge (RAS) should have increased the initial heterotrophic bacterial population similar to Tests 2 and 3. The initial hydrocarbon-degrading bacteria count would also be similar to Tests 2 and 3.

The RAS+Biocat+OX additive provided the lowest extent of hydrocarbon biodegradation (25%, based on a single composite sample analysis). FIG. 2 shows the results of the GC/FID analysis of the residual hydrocarbons in the C8–C30 range compared to the initial hydrocarbons present at Day 0. Similar to Test 3, a greater loss of light (C8-C14) and less loss of heavy (C22 only) hydrocarbons was observed. The change in hydrocarbon from the initial shows that biodegradation is occurring, but to a lesser extent than in Tests 1 and 2. Some of the C8–C11 loss may be due to volatilization during preparation of the test mixes. Biocat 4000 may also have introduced some vegetation-based organics that show up in GC/FID analysis as hydrocarbons in the C15–C30+ range, although this remains to be determined.

Nutrient analysis showed that no nutrients were limiting following the 41 day test. Similar to Tests 2 and 3, the RAS additive caused a high ammonia content to develop in the test mix by Day 41 (1350 mg/kg $NH_4$—N). The heterotrophic bacterial count was lower than the other tests ($2.3 \times 10^6$ MPN/g) indicating that significant bacteria death had occurred. The hydrocarbon-degrading bacteria population was also very low on Day 41. The lower bacterial populations are most likely a result of the high pH in this test mix, compared to the other tests.

Moisture content had dropped to about one-half of the initial, despite periodic misting of the surface of the test mix. At the end of the test, the moisture content in the ¾ of the test mix was only 10.3 wt %, whereas the bottom ¼ was 37 wt %.

Test 4 had the lowest overall rate of respiration, which agrees with the lowest observed temperature in this test mix. The low moisture present at the end of the test would explain the drop off of respiration activity as shown in FIGS. 4 and 5 after Day 13.

Conclusions

The recycled activated sludge (RAS) did not provide an adapted population of hydrocarbon-degrading bacteria and may have introduced a competing cellulolytic activity, although the latter possibility requires further confirmation, RAS biosolids degradation causes a very high ammonia-nitrogen content in excess of 1300 mg/kg, which could be potentially toxic to the hydrocarbon-degrading bacteria.

Biocat 4000 stimulated activity in Test 3, but did not provide enhanced hydrocarbon-degradation results.

Percarbonate solid oxygen release compound caused an initial high pH of 9,1, which resulted in lower microbial activity as shown by respiration and temperature results.

The treatment mix (control) appears to be fairly well balanced and supported good microbial activity and rapid hydrocarbon degradation without additives such as bacteria, nutrients, or oxygen. Adequate total nitrogen (0.87%) and phosphate (78 mg/4) was still present after 41 days treatment.

After 41 days the height of the test mixes had all been 87–92% maintained, indicating that the treatment mix does not readily compact during composting, thereby maintaining its porosity and passive aeration potential.

The treatment mix tends to dry out with time, as water drains downward. The mix does receive added water readily (i.e., is not hydrophobic despite the high initial hydrocarbon content).

Based on the observations made during this test, moisture content maintenance will be a limiting factor in maintaining rapid hydrocarbon biodegradation activity.

Before quoting the findings from this test, the initial and final T.E.H. analysis should be repeated to obtain a measure of confidence in the data. This is required because at the level where hydrocarbons are analyzed, a certain amount of variability is inherent even in a mixture like that described above.

3) Bioremediation Field Plots

Tests were conducted to determine the efficacy of using a combination of canola meal and dry wood shavings to contain and microbially decompose oily drilling residuals in a homogenous mix. The main objective was to collect analytical data from laboratory and field applications to characterize the on-site treatment (mixing) of the present invention and the land spreading process.

30 field plots were established at the University of Alberta Ellerslie Field Research Facility located south of Edmonton, Alberta Canada. Typical drilling location conditions were simulated by removing the organic topsoils from each 3 m×5 m plot.

Results

Figure 7:
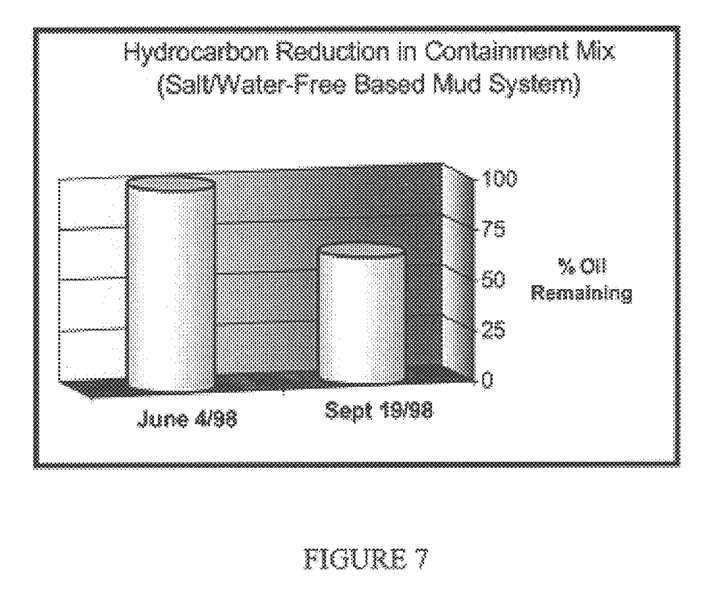

FIGS. 6 and 7 illustrate the results of the above field tests.

Preliminary field results for a period of 107 days indicated that the total reduction in hydrocarbons under field conditions is as high as 57% for invert based containment mixes and 37% for salt water free based containment mixes with minimal leaching limited to the top 2.5 cm of the underlying soil.

As mentioned previously, although the present invention has been described in specific relation to the use of canola (or rape) meal as the protein source, various other sources are also possible. Some examples are as follows: cottonseed meal, soybean meal, alfalfa meal, bone meal, blood meal, feather meal, kelp meal, peanut meal, borage meal, corn meal, coconut meal, sesame seed meal, safflower meal, sunflower meal, hemp meal, and sugar beat meal. It will be understood by persons skilled in the art that any other similar protein source can be used in the present invention.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A composition for treating solid material contaminated with hydrocarbons wherein the hydrocarbon contaminant is interspersed throughout the material, said composition including a protein component, said protein component comprising a protein meal having an indigenous microbial culture capable of metabolizing said hydrocarbon contaminant, and a bulking component.

2. The composition of claim 1 wherein said protein meal is derived from canola, soy, cotton, corn, or peanut material or from other protein based material.

3. The composition of claim 1 wherein said bulking agent is derived from organic material or from inorganic equivalents.

4. The composition of claim 3 wherein said bulking agent is chosen from wood shavings, peat moss, straw or any combination thereof.

5. The composition of claim 1 wherein said protein component is capable of absorbing or adsorbing said hydrocarbon contaminants.

6. A method for treating hydrocarbon contaminated material with the treatment composition of claim 1 comprising the steps of:
   1) contacting said contaminated material with the treatment composition to immobilize and prevent leaching of said contaminant; and,
   2) biodegrading said hydrocarbon contaminant with the microbial culture.

7. A method for treating solid material contaminated with hydrocarbons, wherein the hydrocarbon contaminant is interspersed throughout the material, said process comprising treating said contaminated material with a treatment composition comprising a protein component, said protein component comprising a protein meal having an indigenous microbial culture capable of metabolizing said hydrocarbon contaminant, and a bulking agent, the method comprising the steps of:
   1) contacting said material with said treatment composition to immobilize the hydrocarbon contaminant; and,
   2) biodegrading said contaminant with said microbial culture.

8. The method of claim 7 wherein said contacting phase comprises mixing or blending the contaminated material with the treatment composition.

9. The method of claim 7 wherein said bulking agent is chosen from wood shavings, peat moss, straw or any combination thereof.

10. The method of claim 7 wherein said material comprises drill cuttings or soils.

* * * * *